United States Patent
Deutsch et al.

(10) Patent No.: US 6,296,465 B1
(45) Date of Patent: Oct. 2, 2001

(54) EXTRUSION DIE ASSEMBLY FOR OBTAINING DIFFERENTLY SHAPED PRODUCTS

(75) Inventors: Roman Deutsch, Lutry; Ernst Heck, Vufflens-la-Ville; Jean Horisberger, Ecublens, all of (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/143,018

(22) Filed: Aug. 28, 1998

(30) Foreign Application Priority Data

Aug. 31, 1997 (EP) ................................................. 97202715

(51) Int. Cl.[7] ................................................. B29C 47/06
(52) U.S. Cl. .............. 425/133.1; 425/311; 425/381; 425/382.4; 425/464; 425/466; 425/467
(58) Field of Search ................... 425/382.4, 381, 425/466, 467, 464, 113, 133.1, 131.1, 131.5, 311; 426/284, 283, 516; 264/172.15, 209.8, 209.1

(56) References Cited

U.S. PATENT DOCUMENTS

| | | | |
|---|---|---|---|
| 4,600,550 | * 7/1986 | Cloeren | 264/171 |
| 4,961,892 | * 10/1990 | Prevotat | 264/209.8 |
| 5,147,195 | * 9/1992 | Cloeren | 425/133.5 |
| 5,620,713 | 4/1997 | Rasmussen | 425/131.1 |
| 5,882,694 | * 3/1999 | Guillemette | 425/133.1 |

FOREIGN PATENT DOCUMENTS

| | | | |
|---|---|---|---|
| 1230005 | 12/1987 | (CA) | A23P/1/12 |
| 2 630 963 | * 5/1988 | (FR) . | |

* cited by examiner

*Primary Examiner*—Nam Nguyen
*Assistant Examiner*—Joseph S Del Sole
(74) *Attorney, Agent, or Firm*—Winston & Strawn

(57) ABSTRACT

An extrusion die for making shaped extrudate products has structure which defines a central duct which is convergent from a duct inlet opening to a duct outlet opening and has structure which defines a tubular extrusion duct co-axial with the central duct and which also is convergent from a duct inlet opening to a duct outlet opening. A feed diaphragm member has a portion which converges to an opening which opens to a distribution chamber which diverges so that substance being extruded is distributed to the central and tubular ducts. Diaphragms are provided in the ducts to delimit passage of extrudate substance into the ducts. Additionally, members are provided for altering the position of the central duct and its duct outlet relative to the second duct member and its outlet.

13 Claims, 4 Drawing Sheets

EXTRUSION DIE ASSEMBLY FOR OBTAINING DIFFERENTLY SHAPED PRODUCTS

BACKGROUND OF THE INVENTION

The present invention relates to extrusion of substances, particularly food products, and particularly to dies for extrusion of such substances to obtain shaped products, and more particularly to die structures for extruding a plurality of extrudate streams to obtain products.

European Patent Application Publication No. 0 169 126 (CLEXTRAL) describes a method and installation for manufacturing a composite food product from a single-screw or double-screw extrusion cooker, in which a stream of material is processed in a first conventional processing zone of the extrusion cooker, and then divided in two streams in a second zone comprising two separate parallel processing chambers, the two streams are processed by being, in particular, colored differently in their respective processing chambers, and the streams are combined during their extrusion through a die having a single outlet orifice or a coextrusion die.

SUMMARY OF THE INVENTION

The object of the present invention is to provide an extrusion die making it possible, by extruding a unitary material, to produce a product which has an especially attractive three-dimensional shape, namely, the general shape of a core surrounded by a ring.

For this purpose, the extrusion die according to the present invention comprises a feed diaphragm opening into a distribution chamber communicating, on one hand, with a generally conical convergent central extrusion duct by means of a circular central pre-expansion and/or retarding diaphragm and communicating, on the other hand, with at least one generally conical convergent coaxial tubular extrusion duct by means of at least one annular pre-expansion and/or retarding diaphragm, the central and coaxial tubular extrusion ducts having respective concentric central and annular outlet orifices.

The extruder according to the present invention comprises an elongate sleeve, containing one or two processing screws, and at least one such extrusion die.

Finally, the product according to the present invention, capable of being obtained by extrusion through such a die, has the general shape of a core surrounded by a ring.

DETAILED DESCRIPTION OF THE INVENTION

In this description, the term "diaphragm" means a pipe element, the diameter of which narrows to an orifice of reduced aperture and which may, in particular, take the form of an insert, in which an orifice is provided, to which a generally conical upstream wall converges and from which a generally conical downstream wall diverges.

The expression "pre-expansion and/or retarding" means preliminary expansion and/or retarding of a mass of material processed in an extruder, which takes place at an intermediate stage prior to emergence from the extrusion die. Such pre-expansion and/or retarding may be caused by the passage of the mass through a diaphragm opening into a pre-expansion and/or retarding space or chamber, defined by a divergent wall, as mentioned above, or onto an even wider space provided, for example, immediately downstream of the diaphragm.

The expression "concentric central and annular outlet orifices" means a central outlet orifice, which is located in a plane generally perpendicular to the axis of the die and centered on this axis, and at least one annular orifice, likewise located in a plane generally perpendicular to the axis of the die and also centered on this axis. These orifices may have various shapes, such as a circle, oval, ellipse, heart, triangle, figure of eight, flower petals Or their combinations, such as, for example, a daisy with a circular central orifice and a petal-shaped annular orifice.

The expression "processing screw" means the extruder screw or screws which are driven in rotation within a bore, or two secant bores provided in the sleeve and to which are fastened processing members, such as threads wound helically about their axis. The configuration, pitch, depth and direction of such threads may be provided in various ways along the axis to define various processing zones, such as, for example, transport, moistening, mixing, shearing, compression and/or cooking zones. Such screws may be produced, for example, in one piece or by assembling elements slipped successively onto a shaft.

In a preferred embodiment of the present die comprising a coaxial tubular extrusion duct, the aperture of the pre-expansion and/or retarding diaphragms and/or of the outlet orifices and/or the distance between the planes of the outlet orifices can be adjusted in such a way so that simultaneously cutting off a central strand emerging from the central outlet orifice and a coaxial tubular strand emerging from a concentric annular outlet orifice produces a core surrounded by a ring integral with the periphery of the latter.

In another preferred embodiment of the die comprising a plurality of coaxial tubular extrusion ducts, the aperture of the pre-expansion and/or retarding diaphragms and/or of the outlet orifices and/or the distance between the planes of the outlet orifices can be adjusted in such a way that simultaneously cutting off a central strand emerging from the central outlet orifice and a plurality of coaxial tubular strands emerging from a plurality of concentric annular outlet orifices produces a core surrounded by a plurality of concentric rings integral with the latter at intervals.

The adjustability of the apertures and distances may also make it possible to influence the texture of the product, in particular, for example, the degree of expansion of a cooked and extruded product.

It may be assumed that a suitable adjustment of the apertures and distances, which makes it possible to produce a core surrounded by a ring integral with the periphery of the latter or a core surrounded by a plurality of concentric rings integral with the latter at intervals, is an adjustment which, for example, imparts appreciably different respective speeds to the strands emerging from the central orifice and from the concentric annular orifice.

In the present die, for example, the central extrusion duct may be delimited by the inner wall of an inner nozzle and a coaxial tubular extrusion duct may be delimited by the inner wall of an outer nozzle and by the outer wall of an inner nozzle.

The central outlet orifice may be delimited by the end of an inner nozzle and an annular outlet orifice may be delimited by the ends of inner and outer nozzles.

The aperture of the pre-expansion and/or retarding diaphragms may be adjustable by the substitution of inserts in which these diaphragms are formed.

The aperture of the outlet orifices may be adjustable by the substitution of inner and outer nozzles.

Finally, the distance between the planes of the outlet orifices may be adjustable by the relative axial displacement of inner and outer nozzles.

The extruder apparatus according to the present invention comprises an elongate sleeve, containing one or two processing screws, and at least one extrusion die according to the present invention, and it preferably comprises furthermore, cutting-off means which may, for example, take the form of a rotary knife rotating against the outlet orifices.

In a preferred embodiment of the extruder comprising a plurality of dies, a downstream part of the sleeve, which contains a downstream end of the processing screw or screws, terminates in a front plate which is integral with the sleeve and is provided with a pre-distribution orifice into which opens a pre-distribution chamber communicating with the distribution chambers of the dies by means of the feed diaphragms.

The pre-distribution orifice may open onto the pre-distribution chamber by means of a pre-distribution diaphragm which, for example, may be adjustable by the substitution of the insert in which it is formed.

Preferably, the product obtained by extrusion in accordance with the present invention is intended as human or animal food and suitably is processed by the processing screws of an extruder which supply the mechanical energy necessary to cause the material to pass through the die.

Various particular embodiments of the present product may be considered, such as, for example, cooked and extruded cereals, edible pastes, biscuits for domestic animals or granules for breeding animals, such as cattle, poultry or fish.

In a preferred embodiment, the product is an expanded breakfast cereal capable of being obtained by the extrusion cooking of a mixture based on cereal flour and water in an extrusion cooker comprising one or more dies according to the present invention.

Such a mixture based on flour and water may, for example, comprise 7–20% water, up to 70% cornflour, up to 70% wheat flour, up to 12% saccharose, up to 10% oil, as well as salt, spices and trace elements. It is also possible, for example, to use flour of rice, oats, barley and/or potato and add to it other ingredients, such as starches, glucose, malt, fat, coloring agents and/or flavoring agents.

Extrusion cooking may be carried out in an extrusion cooker which, for example, has a ratio of length to diameter of the screws of about 10–14, with a rotational speed of the screws of 140–250 rpm, under a pressure of 40–180 bar, at 105–180° C., and with a water content in the product on emergence from the die of between 5 and 12%.

The die, extruder and product according to the present invention are described below with reference to the accompanying drawing Figures which are given as examples.

BRIEF DESCRIPTION OF THE DRAWING FIGURES

DETAILED DESCRIPTION OF THE DRAWING FIGURES

Figure 1:
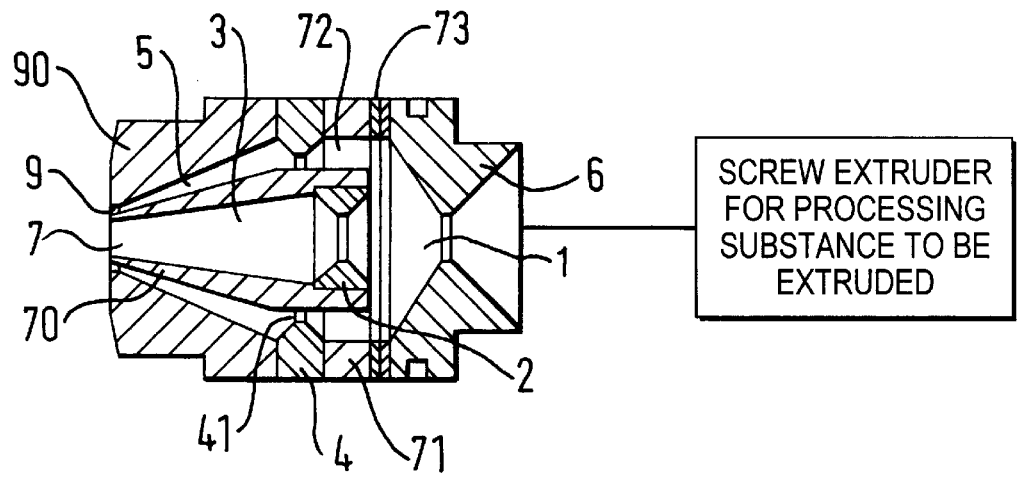
FIGS. 1 and 2 are two views in axial section of the same embodiment of the die, corresponding to two different relative positions of the outlet orifices.
Figure 2:
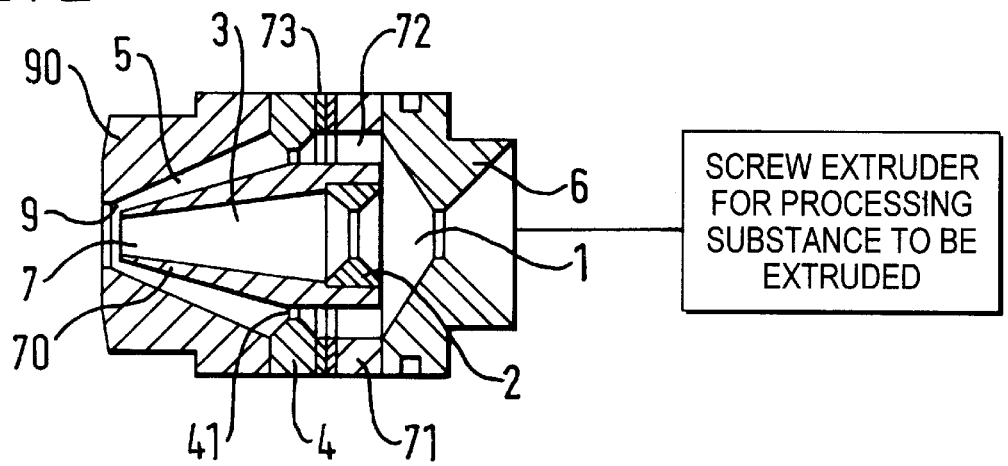

In the embodiment illustrated in FIGS. 1 and 2, the extrusion die comprises a convergent wall feed diaphragm 6 opening into a divergent wall distribution chamber 1, communicating, on one hand, with a generally conical convergent central extrusion duct 3 by means of a circular central pre-expansion and/or retarding diaphragm 2 and communicating, on the other hand, with a generally conical convergent coaxial tubular extrusion duct 5 by means of an annular pre-expansion and/or retarding diaphragm member 4, the central extrusion duct 3 and coaxial tubular extrusion duct 5 having respective concentric central and annular outlet orifices 7 and 9.

The central extrusion duct 3 is delimited by the inner wall surface of an inner nozzle 70. The coaxial tubular extrusion duct 5 is delimited by the inner wall surface of an outer nozzle 90 which circumscribes and is displaced from the outer wall surface of the inner nozzle 70.

The inner nozzle 70 is integral with a positioning disc 71 which circumscribes and thereby is annular with reference to the nozzle 70 outer wall surface and which has holes 72 which ensure communication between the distribution chamber 1 and the annular orifice 41 of the annular diaphragm 4 which, too, circumscribes the nozzle 70 outer wall surface.

The central outlet orifice 7 is delimited by the end of the inner nozzle 70. The annular outlet orifice 9 is delimited by the ends of the inner and outer nozzles 70 and 90.

As illustrated, because of the convergent configuration, the opposing open orifice ends of the ducts, as defined by the wall surfaces noted above, differ in size, and transverse to the longitudinal axis of the wall surfaces and hence, of the ducts, the inner and outer wall surfaces of nozzle 70 have a larger cross-section area at the duct inlet orifice end than at the duct 3 second end outlet orifice 7, and the inner wall surface of nozzle 90 from its first end inlet orifice to the second end outlet orifice 9 converges so that the first end orifice is larger than the second end orifice 9 and is positioned so that it is displaced from the outer surface of nozzle 70 and converges concomitantly with the nozzle 70 to define duct 5, and thus, the orifices of the inlet orifice ends of ducts 3 and 5 are larger than the orifices of the outlet end orifices 7 and 9.

The distance between the planes of the outlet orifices 7 and 9 can be adjusted by the relative axial displacement of the inner nozzle 70 and the outer nozzle 90. In this particular case, the axial displacement of the inner nozzle 70 in relation to the outer nozzle 90 can be adjusted by means of a compensating washer, such as the washer spacer member 73, which may be positioned behind (FIG. 1) or in front (FIG. 2) of the positioning disc 71.

Thus, in the position illustrated in FIG. 1, the central outlet orifice 7 and concentric annular outlet orifice 9 are located in the same plane, whilst, in the position illustrated in FIG. 2, the central outlet orifice 7 is set back from the concentric annular outlet orifice 9.

The aperture of the pre-expansion and/or retarding diaphragm 2 and of the annular diaphragm 4, which define apertures which delimit extrudate passage openings, can be adjusted by the substitution of inserts in which these diaphragms are formed.

The aperture of the outlet orifices can be adjusted by the substitution of inner nozzle 70 and outer nozzle 90.

Figure 3:
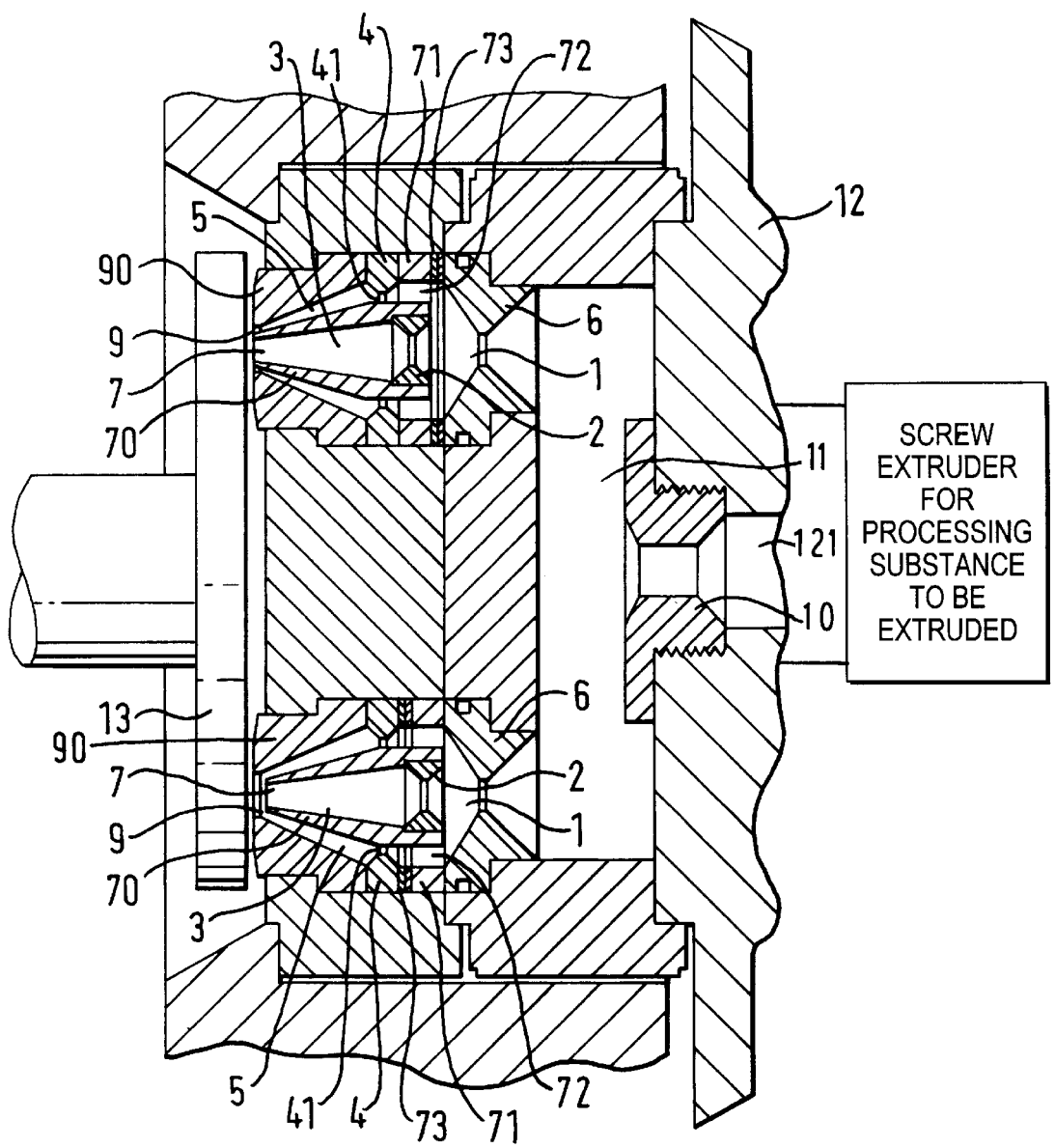
FIG. 3 is a view in partial axial section of an embodiment of an extruder comprising a plurality of dies.

In the embodiment illustrated in FIG. 3, an extruder (represented by the labeled box) for use in the apparatus of the present invention, comprises an elongate sleeve and may contain one or two processing screws, and as illustrated in FIG. 3, the apparatus comprises a plurality of extrusion dies, as are illustrated in FIGS. 1 and 2. The extruder terminates in a front plate 12 which is integral with the sleeve, and a pre-distribution orifice 121 is provided, the orifice 121 opening by means of a pre-distribution diaphragm 10 onto a pre-distribution chamber 11 which communicates with the distribution chamber of each die by means of the feed diaphragms 6.

The extruder apparatus illustrated in FIG. 3 comprises, furthermore, cutting-off means which take the form of a rotary knife 13 rotating against the outlet orifices 7 and 9.

Figure 4:
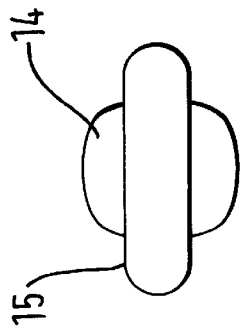
FIG. 4 is a front view of an embodiment of a product produced by apparatus in accordance with the present invention.
Figure 5:
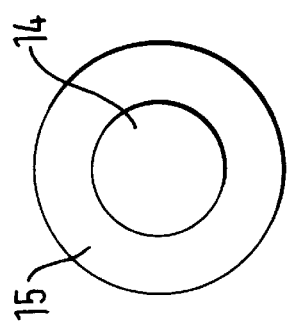
FIG. 5 is a side view of the embodiment of the product illustrated in FIG. 4.
Figure 6A:
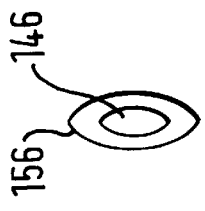
FIGS. 6a–6f illustrate front views of different shapes of products produced by apparatus in accordance with the present invention.
Figure 6B:
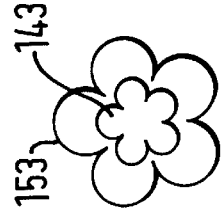
Figure 6C:
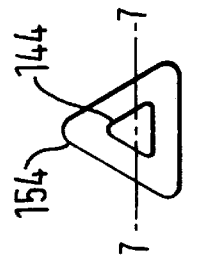
Figure 6D:
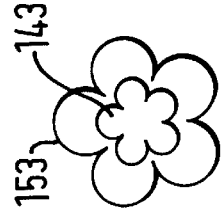
Figure 6E:
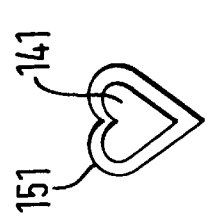
Figure 6F:
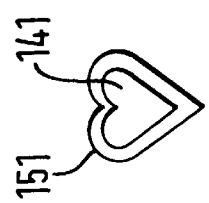

FIGS. 4 and 5 illustrate an embodiment of the product capable of being obtained by extrusion through a die, as illustrated in FIGS. 1 and 2, in which embodiment the core has the shape of a sphere 14. The ring 15, integral with the periphery of the sphere 14, gives the product an attractive appearance resembling that of the planet Saturn with its ring.

FIG. 6 illustrates different embodiments of the product which are capable of being obtained by extrusion through a die similar to that illustrated in FIGS. 1 and 2, with the exception of the exact shape of the outlet orifices, in which embodiments the core is in the shape of a heart 141, a sphere 142, a five-leafed clover 143, a triangle 144, a figure eight 145 and an ellipse 146.

The rings integral with the periphery of these cores are in the corresponding respective shapes of a heart 151, a five-leafed clover 153, a triangle 154, a figure eight 155 and an ellipse 156, with the exception of a six-petal crown shape 152 which is integral with the periphery of a sphere 142 and which gives an appearance of a flower composed of six petals.

All these products have a particularly attractive appearance due to the presence of the ring integral with the periphery of the core.

Figure 7:
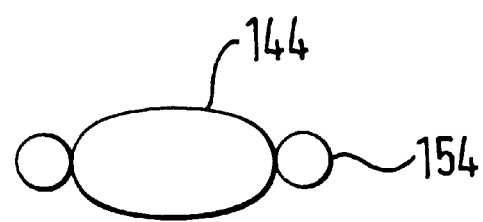
FIGS. 7 and 8 are sectional views, along the line 7—7, of two particular embodiments of the triangular product illustrated in FIG. 6.
Figure 8:
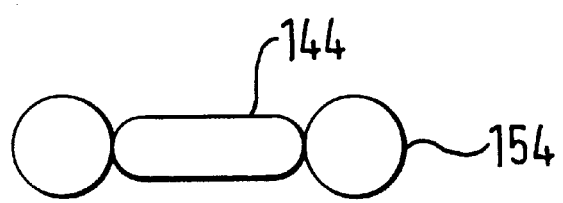

FIGS. 7 and 8 illustrate two particular embodiments of the triangular product illustrated in FIG. 6, in which embodiments the triangular core 144 appears in convex (FIG. 7) or concave (FIG. 8) relief in the triangular ring 154 integral with the periphery of the latter.

Figure 9:
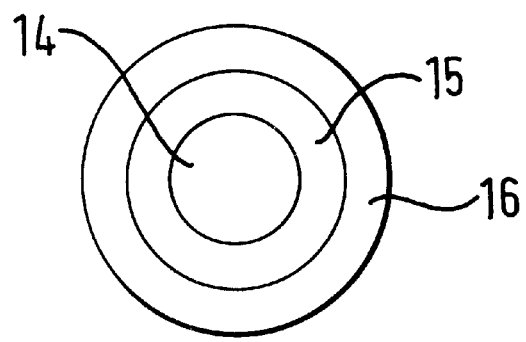
FIG. 9 is a front view of another embodiment of a product produced in accordance with the present invention and provides a representation of an apparatus arrangement for producing the product.

Finally, FIG. 9 illustrates another embodiment of the product capable of being obtained by extrusion through a particular embodiment of the die comprising a central nozzle represented by the circular line identified by reference character numeral 70 and comprising two coaxial tubular nozzles represented by the two circular lines which are identified by reference character numerals 90 and 100 and which confine two coaxial extrusion ducts, and in this embodiment, the core is in the shape of a sphere 14 surrounded by two rings 15 and 16 integral with the latter at intervals.

EXAMPLE

The following example illustrates how a preferred form of the present product, in this particular case an expanded breakfast cereal, is possibly obtained by the extrusion cooking of a mixture based on flour and water in an extrusion cooker comprising a plurality of dies according to the present invention. In this example, as in this entire description, the percentages and parts are given by weight.

With the aid of a double-screw extrusion cooker comprising a plurality of dies, as illustrated in FIG. 3, expanded cereals are produced which take the form of a sphere surrounded by a ring, as illustrated in FIGS. 4 and 5.

For this purpose, a mixture having the following composition is prepared:

| | |
|---|---|
| water | 13% |
| cornflour | 40% |
| wheat flour | 25% |
| sugar | 10% |
| oil | 5% |
| salt/spices | 7% |

The mixture is extrusion-cooked under the following conditions:

Configuration of the Dies:
  Diameter of the circular orifice of the pre-distribution diaphragm: 14 mm,
  diameter of the circular orifice of the feed diaphragm: 8 mm,
  diameter of the circular orifice of the central pre-expansion and/or retarding diaphragms: 8 mm,
  inside and outside diameters of the annular orifices of the annular pre-expansion and/or retarding diaphragms: 26/28 mm,
  diameter of the central outlet orifices: 8 mm,
  inside and outside diameters of the annular outlet orifices: 9/11 mm, and
  distance between the planes of the central and annular outlet orifices: 1 mm.

Extrusion Conditions:
Ratio of length to diameter of the screws: 10,
rotational speed of the screws: 160 rpm,
pressure: 120 bar,
temperature: 150° C., and
water content on emergence from the die: 7%.

Expanded cereals in the form of a sphere surrounded by a ring, having an attractive appearance resembling that of the planet Saturn with its ring, are thus obtained.

What is claimed is:

1. An extrusion die comprising:

a first nozzle member which has a wall surface which defines a first duct which is convergent from a first orifice end to a second orifice end;

a second nozzle member which has an inner wall surface displaced a distance away from the first nozzle member extends longitudinally coaxially with the first duct and which is, concomitantly with the first nozzle member, convergent from a first orifice end to a second orifice end to define a second duct coaxial with the first duct;

a diaphragm positioned in the first duct for delimiting passage of an extrudate substance into the first duct for passage from the first nozzle member first orifice end to the first nozzle member second orifice end;

a second diaphragm positioned for delimiting passage of an extrudate substance into the second duct for passage from the first orifice end of the second nozzle member to the second orifice end of the second nozzle member; and a feed member which defines a chamber and which is positioned for feeding an extrudate substance from the chamber to the two diaphragms to the first and second nozzle member ducts.

2. Apparatus comprising a multiple nozzle die assembly for extrusion of a substance wherein the apparatus comprises:

a first nozzle member defined by a wall which has inner and outer wall surfaces and which extends longitudinally from a first end to a second end wherein the inner wall surface is tubular and extends longitudinally about an axis and delimits a first duct which extends from a nozzle first end orifice to a nozzle second end orifice and wherein the tubular wall converges from the first end to the second end so that, transverse to the longitudinal axis, the inner and outer wall surfaces at the first end have cross-sectional sizes which are larger than those of, respectively, the inner and outer wall surfaces at the second end and so that the first end orifice is larger than the second end orifice;

a diaphragm member which is positioned in the first nozzle member duct for delimiting an aperture for passage of an extrudate substance into the first duct; and (i) a second nozzle member having an inner tubular wall surface, (ii) a second diaphragm member and (iii) a disk member which circumscribe the first nozzle member and (iv) an extrudate substance feed member wherein the disk member is positioned at a position between the feed member and the second diaphragm member and wherein:

the second nozzle member inner tubular wall surface extends longitudinally from a first end which delimits an orifice to a second end which delimits an orifice and which is configured to converge from the first end of the second nozzle member to the second end of the second nozzle member so that the first end wall surface orifice of the second nozzle member has a size larger than that of the second end wall surface orifice of the second nozzle member and which is positioned to longitudinally circumscribe the first nozzle member so that, when positioned, each of the first nozzle member outer wall surface and the second nozzle wall surface concomitantly converge from the first end of the second nozzle member to the second end of the second nozzle member and so that the second nozzle member wall surface is displaced from the first nozzle member outer wall surface to delimit first and second end orifices of the nozzle members and a second duct which extends from the first ends of the first and second nozzle members to the second ends of the first and second nozzle members and so that the longitudinal axis of the second duct is coaxial with the first nozzle member inner wall surface longitudinal axis;

the second diaphragm member is positioned for delimiting an aperture for passage of an extrudate substance into the second duct;

the disk member is integrated with the first nozzle outer wall surface and is configured with holes to allow passage of an extrudate substance therethrough to the second diaphragm member and second duct; and the feed member comprises (i) a first wall which defines a first chamber which diverges from a first end which delimits an orifice to a second end which delimits an orifice so that the second end orifice of the feed member is larger than the first end orifice of the feed member and has a size sufficient and is positioned for distributing an extrudate substance to the first end orifice of the first nozzle member and to the holes of the disk member and (ii) a second wall which has a first end which delimits an orifice and which is positioned for communicating with the feed member first end orifice for feeding an extrudate substance to the first wall first end orifice and chamber and which extends and diverges from the second wall first end to define a second chamber.

3. Apparatus according to claim 2 further comprising a further tubular member positioned about the second nozzle member and wherein the second nozzle member and further tubular member are configured and positioned to define a further duct which extends longitudinally coaxially with the first and second ducts.

4. Apparatus according to claim 2 or 3 further comprising a washer spacer member which is positioned between the disk member and the second diaphragm member.

5. Apparatus according to claim 2 or 3 further comprising a washer spacer member which is positioned between the disk member and the feed member.

6. Apparatus according to claim 2 or 3 wherein the diaphragm members comprise diaphragms formed in insert members for substitution of diaphragm members.

7. Apparatus according to claim 2 wherein the first and second nozzle members are configured and arranged for, upon extrusion of a substance from the nozzle members, obtaining a product having a core surrounded by a ring integrated with the core.

8. Apparatus according to claim 3 wherein the first and second nozzle members and the further tubular member are configured and arranged for, upon extrusion of a substance from the nozzle members and further tubular member, obtaining a product having a core surrounded by a plurality of concentric rings integral with the core.

9. Apparatus according to claim 2 further comprising an extruder which comprises an elongated screw for extrusion processing of a substance, a sleeve which contains the screw and a plate which is integral with the sleeve and which is connected with the feed member second chamber and which has an orifice for outlet of extrudate substance from the extruder to the feed member second chamber.

10. Apparatus according to claim 9 further comprising a second screw contained by the sleeve.

11. Apparatus according to claim 9 further comprising a rotary knife positioned for cutting extrudate substance exiting the first and second nozzle members.

12. Apparatus according to claim 9 wherein there are a plurality of multiple nozzle die assemblies connected with the extruder and further comprising a chamber positioned between the extruder orifice and the plurality of multiple nozzle die assemblies for distributing extrudate substance from the extruder simultaneously to the plurality of multiple nozzle die assemblies.

13. Apparatus according to claim 12 further comprising a rotary knife positioned for cutting extrudate substance exiting the plurality of multiple nozzle die assemblies.

* * * * *